US009471060B2

United States Patent
Liao et al.

(10) Patent No.: US 9,471,060 B2
(45) Date of Patent: Oct. 18, 2016

(54) VEHICULAR TRAFFIC GUIDANCE AND COORDINATION SYSTEM AND METHOD

(71) Applicant: General Electric Company, Schenectady, NY (US)

(72) Inventors: Hongwei Liao, Niskayuna, NY (US); Mauricio Castillo-Effen, Niskayuna, NY (US); Matthew Christian Nielsen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/564,706

(22) Filed: Dec. 9, 2014

(65) Prior Publication Data

US 2016/0161947 A1   Jun. 9, 2016

(51) Int. Cl.
| | |
|---|---|
| *G06G 7/76* | (2006.01) |
| *G05D 1/00* | (2006.01) |
| *A01B 69/04* | (2006.01) |
| *E02F 9/20* | (2006.01) |
| *A01B 79/00* | (2006.01) |
| *E02F 9/26* | (2006.01) |

(52) U.S. Cl.
CPC ............ *G05D 1/0027* (2013.01); *A01B 69/008* (2013.01); *A01B 79/005* (2013.01); *E02F 9/2025* (2013.01); *E02F 9/2045* (2013.01); *E02F 9/26* (2013.01)

(58) Field of Classification Search
USPC ...................... 701/24–26, 120–123, 32.3, 50; 718/104; 455/456.1; 340/991–992
See application file for complete search history.

(56) References Cited

U.S. PATENT DOCUMENTS

| | | | |
|---|---|---|---|
| 5,572,428 | A | 11/1996 | Ishida et al. |
| 5,640,323 | A | 6/1997 | Kleimenhagen et al. |

(Continued)

OTHER PUBLICATIONS

Parallelized search for the optimal/sub-optimal solutions of task scheduling problem taking account of communication overhead Kai, M.; Hatori, T.; Communications, Computers and signal Processing, 2001. PACRIM. 2001 IEEE Pacific Rim Conference on Year: 2001, vol. 1; pp. 327-330 vol. 1, DOI: 10.1109/PACRIM.2001.953589.*

(Continued)

*Primary Examiner* — Cuong H Nguyen
(74) *Attorney, Agent, or Firm* — GE Global Patent Operation

(57) ABSTRACT

A system and method for guiding and coordinating vehicular traffic determine tasks to be completed by vehicles in a transportation network in order to complete an objective, allocate the tasks among the vehicles, and determine sets of allowable actions for the vehicles based on the allocation of the tasks. The sets of allowable actions dictate plural different allowable actions that the vehicles are allowed to perform in order to complete the tasks allocated to the vehicles. The allowable actions are determined such that the vehicles are scheduled to complete the tasks and complete the objective without the vehicles colliding or blocking movement of each other. The allowable actions are communicated to the vehicles such that the vehicles are permitted to select one or more of the allowable actions and prohibited from performing one or more other actions during performance of the tasks allocated to the vehicles.

14 Claims, 7 Drawing Sheets

(56) References Cited

U.S. PATENT DOCUMENTS

| | | | |
|---|---|---|---|
| 5,646,845 A | 7/1997 | Gudat et al. | |
| 5,648,901 A | 7/1997 | Gudat et al. | |
| 6,351,697 B1 | 2/2002 | Baker | |
| 6,393,362 B1 | 5/2002 | Burns | |
| 6,741,921 B2 | 5/2004 | Cohen et al. | |
| 8,170,787 B2 | 5/2012 | Coats et al. | |
| 8,364,189 B2 | 1/2013 | Mintah et al. | |
| 8,412,421 B2 | 4/2013 | Greiner et al. | |
| 8,437,924 B2 | 5/2013 | Greiner et al. | |
| 8,564,446 B2 | 10/2013 | Gunderson et al. | |
| 8,606,495 B2 | 12/2013 | Makela et al. | |
| 8,626,565 B2* | 1/2014 | Petroff | G06Q 10/02 705/1.1 |
| 8,655,518 B2 | 2/2014 | Cooper et al. | |
| 8,914,182 B2* | 12/2014 | Casado | G05D 1/0088 701/24 |
| 9,146,603 B2* | 9/2015 | Reber | G06F 1/3203 |
| 2006/0221909 A1* | 10/2006 | Farineau | H04B 7/18543 370/336 |
| 2008/0208646 A1 | 8/2008 | Thompson | |
| 2009/0327011 A1 | 12/2009 | Petroff | |
| 2010/0063716 A1* | 3/2010 | Brozat | G08G 5/0043 701/120 |
| 2011/0307141 A1* | 12/2011 | Westerlage | G06Q 30/0283 701/29.1 |
| 2013/0116916 A1 | 5/2013 | Kickbusch | |
| 2013/0144467 A1 | 6/2013 | Kickbusch et al. | |
| 2013/0144670 A1 | 6/2013 | Kickbusch | |
| 2013/0204753 A1 | 8/2013 | Wallace | |
| 2013/0304545 A1 | 11/2013 | Ballew et al. | |
| 2013/0304863 A1* | 11/2013 | Reber | G06F 1/3203 709/218 |
| 2014/0012954 A1 | 1/2014 | Dorn et al. | |
| 2014/0031059 A1* | 1/2014 | Rhoads | G08G 1/08 455/456.1 |
| 2014/0067694 A1* | 3/2014 | Moos | G06Q 10/20 705/305 |
| 2014/0074339 A1* | 3/2014 | Casado | G05D 1/0088 701/24 |
| 2014/0088820 A1 | 3/2014 | Jericho et al. | |
| 2014/0089030 A1 | 3/2014 | Bell | |
| 2014/0089031 A1 | 3/2014 | Bell | |
| 2014/0089032 A1 | 3/2014 | Bell | |
| 2014/0094999 A1 | 4/2014 | Petroff | |
| 2014/0100777 A1 | 4/2014 | Petroff | |
| 2014/0122162 A1 | 5/2014 | Baker | |
| 2014/0129138 A1 | 5/2014 | Chomal | |
| 2014/0136025 A1 | 5/2014 | Cooper et al. | |

OTHER PUBLICATIONS

AUV (Redermor) Obstacle Detection and Avoidance Experimental Evaluation; Quidu, I.; Hetet, A.; Dupas, Y.; Lefevre, S. OCEANS 2007—Europe; Year: 2007; pp. 1-6, DOI: 10.1109/OCEANSE.2007.4302304.*

Cassandras, Christos G.; Lafortune, Stephane; "Introduction to Discrete Event Systems", Second Edition, Library of Congress Control No. 2007931603; Springer Scient+Business Media, LLC, 233 Spring Street, New York, NY 10013, pp. 1-11, (11 pgs.).

Cassandras, Christos G.; Lafortune, Stephane; "Introduction to Discrete Event Systems", Second Edition, Section 3.4 Control With Partial Controllability, Library of Congress Control No. 2007931603; Springer Scient+Business Media, LLC, 233 Spring Street, New York, NY 10013, pp. 145-156, (12 pgs.).

Cassandras, Christos G.; Lafortune, Stephane; "Introduction to Discrete Event Systems", Second Edition, Section 3.4 Control With Partial Controllability, Library of Congress Control No. 2007931603; Springer Scient+Business Media, LLC, 233 Spring Street, New York, NY 10013, pp. 157-173, (17 pgs.).

Cassandras, Christos G.; Lafortune, Stephane; "Introduction to Discrete Event Systems", Second Edition, Chapter 3 Supervisory Control, Library of Congress Control No. 2007931603; Springer Scient+Business Media, LLC, 233 Spring Street, New York, NY 10013, pp. 132-144, (12 pgs.).

* cited by examiner

VEHICULAR TRAFFIC GUIDANCE AND COORDINATION SYSTEM AND METHOD

FIELD

Embodiments of the subject matter disclosed herein relate to guiding and coordinating concurrent movements of several vehicles in an area, such as in and/or around an underground mine or above-ground mine.

BACKGROUND

Some networks of routes have many vehicles concurrently moving to perform separate tasks. For example, underground mines can include many interconnected tunnels and drifts through which mining vehicles move to perform mining operations. Because of the limited space inside the mine, the movements of the mining vehicles can be significantly limited. When many mining vehicles are concurrently moving to perform various tasks of the mining operations, conflicts can frequently arise between the mining vehicles.

These conflicts can involve vehicle collisions, vehicles being blocked from further movement due to other vehicles, and the like. To reduce occurrences of these conflicts, the mining vehicles may operate according to a schedule to restrict movements of the vehicles to locations and times of the schedule. But, with many concurrently moving vehicles in a continuous moving system of the vehicles, generation of a schedule that does not include any conflicts between the vehicles can be labor intensive and/or require significant computational power. Additionally, allowing individual operators of the vehicles to individually choose how to control the vehicles likely leads to many conflicts, as the operators may be unaware of the movements of other vehicles.

BRIEF DESCRIPTION

In one embodiment, a method (e.g., for guiding and coordinating vehicular traffic) includes determining tasks to be completed by mining vehicles in a mine formed by plural interconnected mining routes in order to complete an economic objective. The economic objective includes one or more of removing a first amount of material from the mine that is associated with at least a designated amount of financial revenue, moving at least a second amount of the material from the mine that is associated with a designated amount of mining throughput, and/or keeping operational costs associated with the mining vehicles completing the tasks below a designated financial cost threshold. The method also includes receiving (at a central controller that is off-board the mining vehicles) bid signals from the mining vehicles. The bid signals are representative of one or more of current statuses of the mining vehicles or capacities of the mining vehicles to perform the tasks. The method also includes allocating the tasks to be completed by the mining vehicles in the mine among the mining vehicles. The tasks can be allocated based at least in part on the bid signals received from the mining vehicles, and can be allocated such that the economic objective is scheduled to be achieved by the mining vehicles by completing the tasks as allocated. The method also can include determining respective sets of allowable actions for the mining vehicles based at least in part on the tasks as allocated among the vehicles. The set of allowable actions for each mining vehicle can include plural different allowable actions that the mining vehicle is allowed to perform in order to complete the task or the tasks allocated to the mining vehicle. The sets of allowable actions for the mining vehicles can be determined such that the mining vehicles are scheduled to complete the tasks and complete the economic objective without two or more of the mining vehicles colliding or blocking each other. The method also can include communicating the sets of allowable actions to the mining vehicles such that the mining vehicles are permitted to select one or more of the allowable actions in the sets communicated to the respective mining vehicles and prohibited from performing one or more other actions. The method may further include updating statuses of the mining vehicles at the central controller responsive to the mining vehicles operating according to one or more of the allowable actions in the sets of allowable actions communicated to the mining vehicles, and determining an updated set of allowable actions for one or more of the mining vehicles based at least in part on the tasks as allocated among the vehicles and the statuses of the mining vehicles that are updated. The updated set of allowable actions for the one or more mining vehicles can be determined such that the mining vehicles are scheduled to complete the tasks and complete the economic objective without two or more of the mining vehicles colliding or blocking each other. The method also can include communicating the updated set of allowable actions to the one or more mining vehicles.

In another embodiment, a method (e.g., for guiding and coordinating vehicular traffic) includes determining tasks to be completed by vehicles in a transportation network formed by plural interconnected routes in order to complete an objective, allocating the tasks to be completed by the vehicles in the transportation network among the vehicles, and determining sets of allowable actions for the vehicles based at least in part on allocation of the tasks. The sets of allowable actions dictate plural different allowable actions that the vehicles are allowed to perform in order to complete the task or the tasks allocated to the vehicles. The sets of allowable actions are determined such that the vehicles are scheduled to complete the tasks and complete the objective without two or more of the vehicles colliding or blocking movement of each other. The method also can include communicating the sets of allowable actions to the vehicles such that the vehicles are permitted to select one or more of the allowable actions in the sets communicated to the respective vehicles and prohibited from performing one or more other actions during performance of the tasks allocated to the vehicles.

In another embodiment, a system (e.g., a vehicular coordination and guidance system) includes a controller configured to determine tasks to be completed by vehicles in a transportation network formed by plural interconnected routes in order to complete an objective. The controller also is configured to allocate the tasks to be completed by the vehicles in the transportation network among the vehicles and to determine sets of allowable actions for the vehicles based at least in part on allocation of the tasks. The sets of allowable actions dictate plural different allowable actions that the vehicles are allowed to perform in order to complete the task or the tasks allocated to the vehicles, where the sets of allowable actions are determined such that the vehicles are scheduled to complete the tasks and complete the objective without two or more of the vehicles colliding or blocking movement of each other. The controller also can be configured to communicate the sets of allowable actions to the vehicles such that the vehicles are permitted to select one or more of the allowable actions in the sets communicated to the respective vehicles and prohibited from performing one or more other actions during performance of the tasks allocated to the vehicles.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

One or more embodiments described herein provide systems and methods that guide and coordinate concurrent movements of several vehicles in a transportation network. Examples of the systems and methods are applied to the guidance and coordination of mining vehicles in an underground mine. Not all embodiments are so limited. For example, one or more embodiments of the systems and methods described herein may be used to guide and coordinate concurrent movements of vehicles other than mining vehicles (such as other off-highway vehicles, rail vehicles, automobiles, marine vessels, airplanes, or the like) and/or movements of vehicles in locations other than in and/or around underground mines (e.g., networks of roads, tracks, waterways, surface mines, or other routes).

Figure 1:
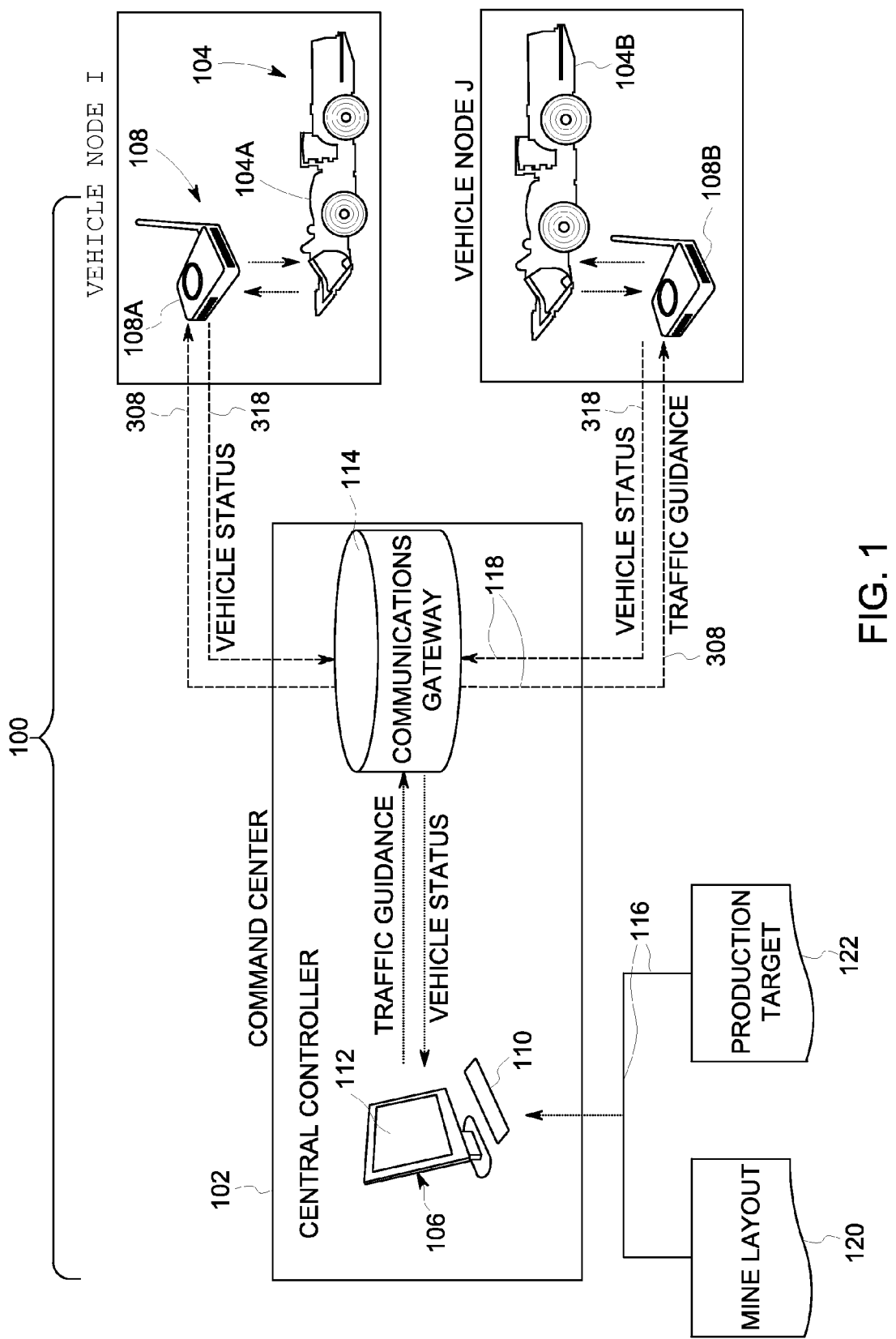
FIG. 1 is a schematic illustration of one embodiment of a vehicular coordination and guidance system.

FIG. 1 is a schematic illustration of one embodiment of a vehicular coordination and guidance system 100. The system 100 may be referred to as a guidance system and/or a coordination system. The system 100 may be a distributed system in that two or more components of the system 100 may be disposed in different locations and/or at least one component may move separately from at least one other component of the system 100. The system 100 includes a command center 102, which can represent a location that is off-board vehicles 104 (e.g., vehicles 104A, 104B in FIG. 1), such as a dispatch or scheduling facility or building. The command center 102 includes a central controller 106 that plans traffic of the vehicles 104, such as by allocating tasks to be performed by the vehicles 104 among the vehicles 104, monitoring movements and completion or progress of the tasks of the vehicles 104, determining allowable actions that the vehicles 104 may take, communicating the allowable actions and/or tasks to the vehicles 104, and the like, as described herein. The system 100 also includes vehicle controllers 108 (e.g., controllers 108A, 108B) disposed onboard the vehicles 104.

The controllers 106, 108 represent hardware circuits or circuitry that include and/or are connected with one or more processors, such as one or more computer processors, microprocessors, electronic controllers, or other electronic logic-based devices. The controllers 106, 108 can include one or more input devices 110 (e.g., keyboard, touchscreen, electronic mouse, throttles, pedals, steering wheels, joysticks, levers, buttons, or the like) and/or one or more output devices 112 (e.g., touchscreen, monitor, speaker, or the like) to communicate any or all of the information and data described herein to one or more operators of the system 100 (e.g., operators of the central controller 106 and/or operators of the vehicle controllers 108).

A communication network operably connects the controllers 106, 108 with each other. The communication network can be at least partially formed from a communications gateway 114 and one or more wired connections 116 and/or wireless connections 118. The communications gateway 114 can represent hardware circuits or circuitry that include and/or are connected with one or more processors, such as one or more computer processors, microprocessors, electronic controllers, or other electronic logic-based devices. The communications gateway 114 and the vehicle controllers 108 optionally can include transceiving circuitry (e.g., antennas and associated hardware) to allow for the communication of information over the wired and/or wireless connections 116, 118. Optionally, one or more of the wired connections 116 shown in FIG. 1 may be a wireless connection 118, one or more of the wireless connections 118 may be a wired connection 116, and/or one or more of the connections 116, 118 may be formed from a combination of one or more wired connections 116 and/or one or more wireless connections 118.

Figure 2:
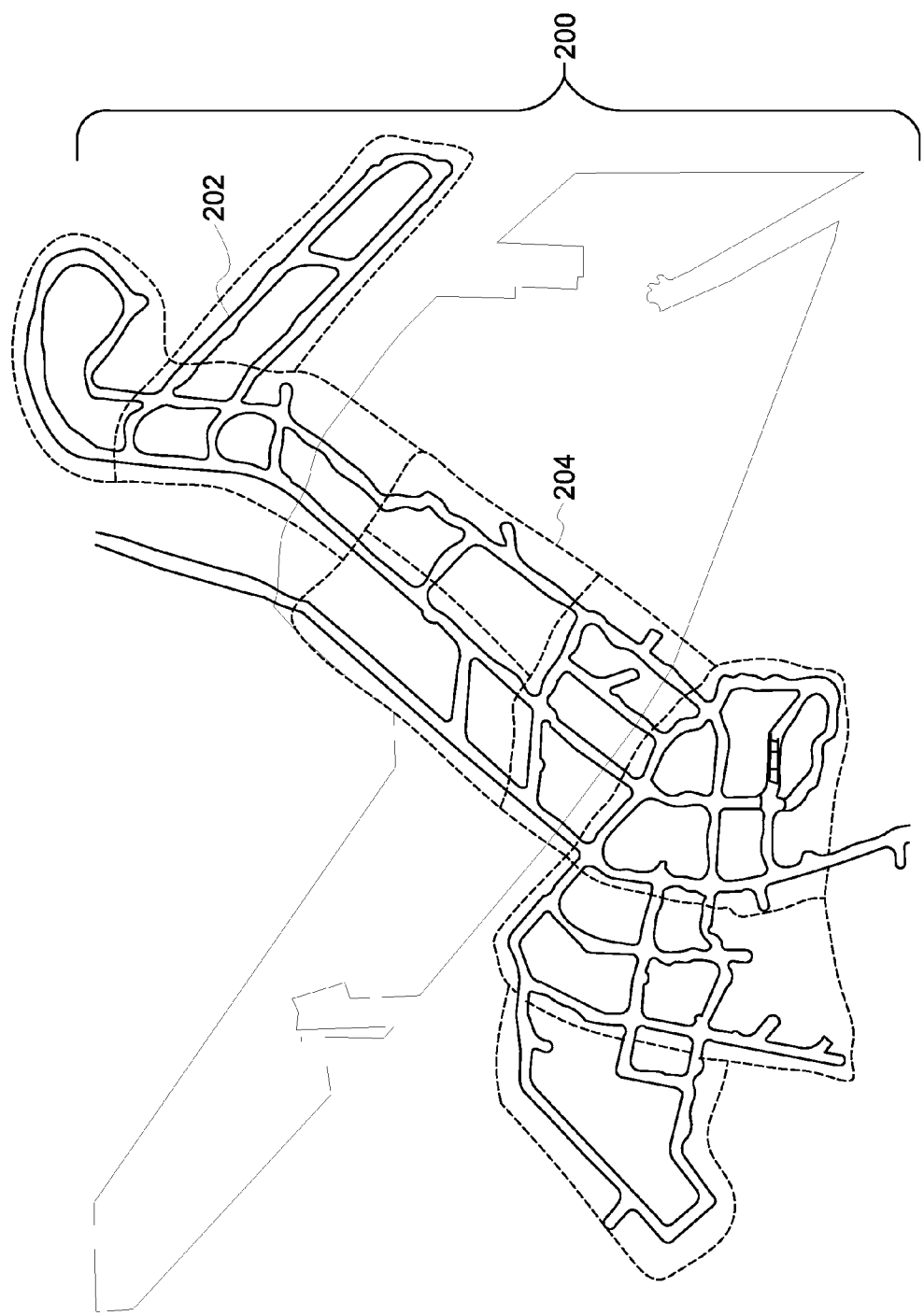
FIG. 2 illustrates one example of a transportation network in which vehicles shown in FIG. 1 may move as coordinated and guided by the system shown in FIG. 1.

FIG. 2 illustrates one example of a transportation network 200 in which the vehicles 104 may move as coordinated and guided by the system 100 shown in FIG. 1. The network 200 is formed from several interconnected routes 202, which can represent tunnels, drifts, or other areas of an underground mine in which the vehicles 104 may move. Alternatively, the routes 202 can represent roads, interstates, water channels, air routes, or the like. The transportation network 200 may be a closed network, such as a network of routes 202 that is not accessible to one or more other transportation networks. For example, an underground mine may be formed from underground tunnels, drifts, or the like, that is not connected with an above-ground network of interstate roads. Alternatively, the transportation network may be an open network, such as several roads in a metropolitan area. In another embodiment, the transportation network may be a set of virtual networks that divide a surface (e.g., an above-ground mine) into traffic corridors and impose certain traffic rules or constraints that prevent certain movements (e.g., only allow movement in one direction along certain corridors or routes, only allow turns in one direction from one corridor or route, etc.

Figure 3:
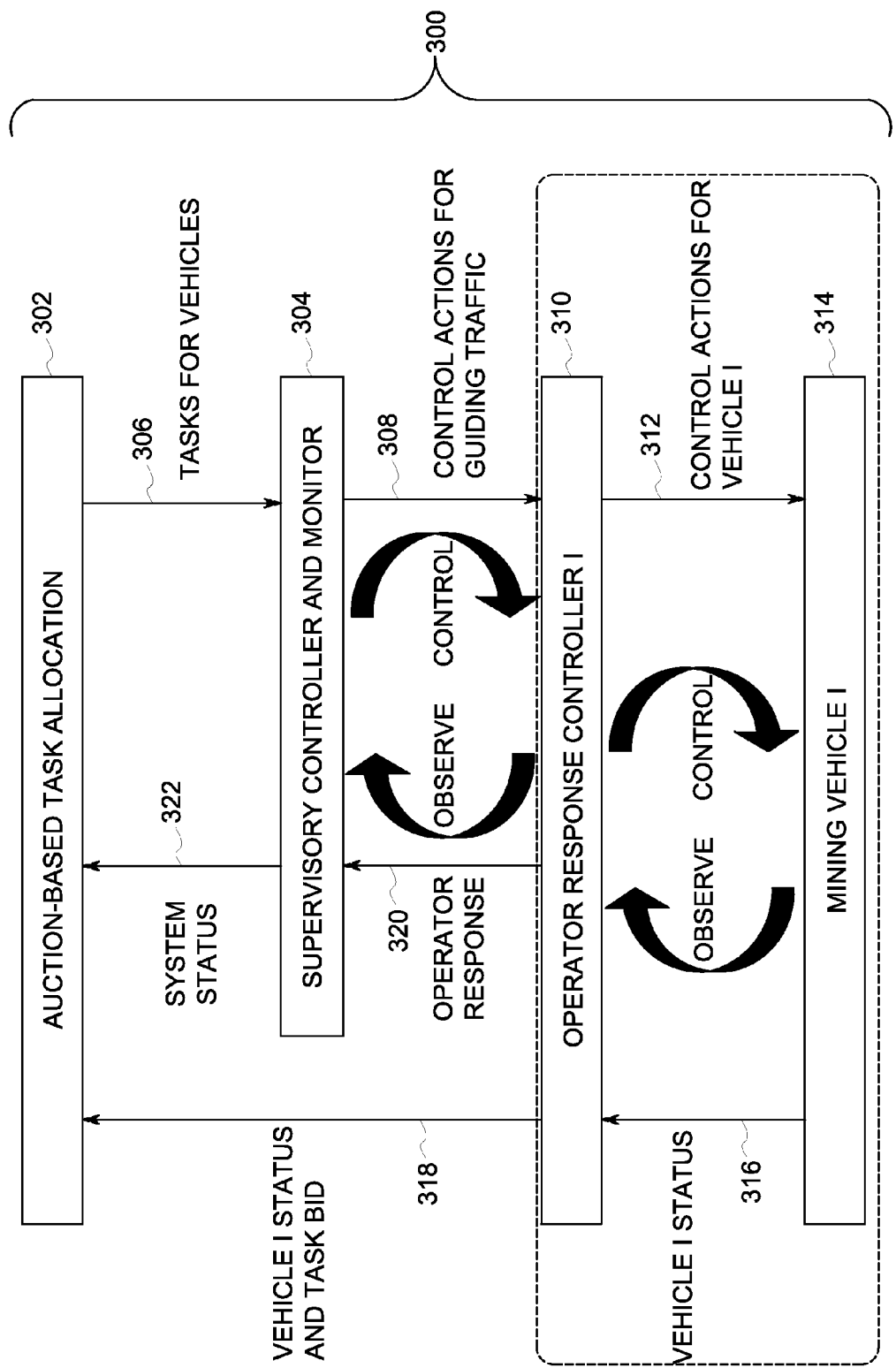
FIG. 3 illustrates an organizational diagram of one embodiment of an architecture of the system shown in FIG. 1.

FIG. 3 illustrates an organizational diagram of one embodiment of the architecture of the system 100 shown in FIG. 1. The system 100 can be organized in a hierarchical structure 300, with top and middle layers 302, 304 of the structure 300 representing operations of the central controller 106 shown in FIG. 1. In one aspect, the central controller 106 can include modules that perform the operations. A module can represent one or more processors and/or hardware circuits or circuitry that operate based on one or more sets of instructions stored on a computer readable storage medium, such as a computer hard drive, optical drive, flash drive, or the like. The top layer 302 can represent a dispatcher module of the central controller 106 that dynamically allocates tasks to the vehicles 104 based on the real-time status of the system 100 and the vehicles 104.

Several vehicles 104 may move in the transportation network 200 (shown in FIG. 2) at the same time, or during overlapping time periods. These vehicles 104 may move to different locations in the network 200 to perform various tasks. A task can include a job, duty, responsibility, or the like, that is assigned to one or more vehicles 104 to be performed at a designated location, within a designated period of time, and/or at a designated time. Examples of tasks can be to travel to a designated location to remove material from a mine, travel to a designated location to drop off material in the mine, travel to a designated location to pick up and/or drop off supplies, materials, operators, batteries, or the like.

The central controller 106 can allocate several tasks to different vehicles 104 in order to meet one or more targets, while subject to one or more constraints. The targets can be obtained from a production database 122 shown in FIG. 1. The production database 122 can represent a computer readable storage medium that stores tasks to be completed. A target can include a goal of the system 100, such as a production target to remove at least a designated amount of material from a mine within a designated period of time, to move the vehicles 104 between designated locations in the transportation network 200 according to a schedule, to move people and/or cargo between different locations in the transportation network 200 before designated times, or the like. The constraints can be limitations on how quickly the tasks can be completed, such as limitations on how much material, cargo, passengers, or the like, can be carried by the vehicles 104, how long operators of the vehicles 104 are permitted (e.g., legally permitted or contractually obligated) to work, how fast the vehicles 104 can move, how long the vehicles 104 can operate before refueling, inspection, repair, or the like, etc.

The central controller 106 can determine which tasks to assign to which vehicles 104 based on a variety of input factors, such as an equipment network in the transportation network 200, vehicle locations, route topology, vehicle specifications, safety factors, states of energy of the vehicles 104, capacities of the vehicles 104, speeds of the vehicles 104, and the like.

The equipment network can represent the locations and/or statuses of non-vehicle equipment in the transportation network 200 that is used to perform the tasks. For example, the location, availability, operative state, etc., of mining equipment used in a mine can be used as input to determine how to allocate the tasks. The mining equipment that can only be used with certain vehicles 104 may be assigned only to those vehicles 104.

The route topology can represent the grades, curvatures, widths, height restrictions, and the like, of the routes in the transportation network 200, and the vehicle specifications can include sizes of the vehicles 104, tractive effort or torque generating abilities of the vehicles 104, etc. The tasks can be assigned based on the route topology and vehicle specifications by assigning tasks to vehicles 104 that are able to travel over and/or through the routes 202 based on the tractive efforts that the vehicles 104 are able to generate (e.g., to travel up or down steep grades), the sizes of the vehicles 104 being small enough to fit in tunnels, or the like.

The route topology can be obtained by the central controller 106 from another location, such as a route database 120 shown in FIG. 1. The route database 120 can represent a computer readable storage medium that stores the locations, intersections, grades, maps, or the like, of the routes 202 in the transportation network 200.

The vehicle specifications can include an acceleration capability (e.g., how quickly the vehicle can increase speed), a deceleration capability (e.g., how quickly the vehicle can decrease speed), weight, size, energy efficiency (e.g., how much electric energy and/or fuel is consumed to perform a designated amount of work), or the like.

The safety factors can include constraints that limit which vehicles 104 are assigned to certain tasks. For example, some tasks may not be assigned to certain vehicles 104 because the tasks could require the vehicles 104 to carry more than a designated load limit of the vehicle 104, to travel faster than an upper speed limit of the vehicle 104 and/or route 202, to have an operator working longer than a legal and/or contractual limit, or the like.

The states of energy can represent how much energy, fuel, or the like, that the vehicles 104 have for use in performing the tasks. Tasks requiring greater amounts of energy (e.g., electric energy) or fuel may not be assigned to vehicles 104 having less available energy and/or fuel than other vehicles 104, while tasks requiring lesser amounts of energy and/or fuel may be assigned to a larger number of vehicles 104.

The capacities of the vehicles 104 can represent the amount of cargo, materials, passengers, or the like, that the vehicles 104 can carry. Tasks requiring larger amounts of cargo, materials, or passengers to be transported may only be assigned to vehicles 104 having sufficiently large capacities, while these tasks are not assigned to other vehicles 104.

The speeds of the vehicles 104 can represent how fast the vehicles 104 can move. Tasks requiring vehicles 104 to travel at least a designated lower speed threshold in order to reach and/or complete the task within a period of time may only be assigned to vehicles 104 having sufficient speeds and may not be assigned to vehicles 104 having slower speeds.

The vehicle controllers 108 can report these factors to the central controller 106, such as by measuring the energy states, capacities, speeds, or the like, using one or more sensors and then communicating the values to the central controller 106, having an operator input the values of the factors, etc.

The central controller 106 can allocate the tasks to the vehicles 104 by assigning different vehicles 104 to complete different sets of the tasks. The tasks may be assigned to the vehicles 104 according to an auction allocation. Alternatively, another technique may be used, such as a random distribution of the tasks, a manual distribution of the tasks, or the like. The central controller 106 identifies the allocated tasks to the vehicle controllers 108 as "tasks for vehicles" 306, as shown in FIG. 3 and also referred to as task messages. The dispatcher module of the central controller 106 can communicate task messages representative of the allocated tasks to a traffic guidance module of the central controller 106, represented by the second level 304 shown in FIG. 3.

The tasks may be allocated dynamically by the central controller 106. For example, the central controller 106 may change which tasks are assigned to various vehicles 104 as the vehicles 104 move around to perform the tasks, and may change the task assignments of vehicles 104 as the vehicles are performing the tasks and/or moving toward locations where the tasks are to be completed. Alternatively, the tasks may be statically allocated. For example, the tasks may be assigned to the vehicles 104 by the central controller 106 and the central controller 106 does not re-assign or change the assignments of the tasks until the vehicles 104 complete the tasks.

Based on and responsive to identification of the tasks for the vehicles 306, the traffic guidance module of the central controller 106 can examine locations and statuses (e.g., directions of movement, speeds, progress of task completion, etc.) of the vehicles 104 and determine traffic guidance 308 for the vehicles 104 ("control actions for guiding traffic" in FIG. 3). The traffic guidance 308 is communicated from the central controller 106 to the vehicle controllers 108 and is used by the vehicle controllers 108 to determine actions that the vehicles 104 can take. In one embodiment, the traffic guidance 308 is determined by the central controller 106 as the times, speeds, directions, and the like, that the vehicles 104 are allowed to move in order to complete the tasks allocated to the vehicles 104, while avoiding actions that cause the vehicles 104 to move to locations that block movement of other vehicles 104 and/or cause collisions between vehicles 104.

In one embodiment, the traffic guidance module receives the tasks for the vehicles 306, discretizes a model of the transportation network 200 and states of the vehicles 104, and provides the traffic guidance to a third level 310 as the traffic guidance 308. The third level 310 represents operations of the vehicle controller 108 ("vehicle i" in FIG. 3). A fourth level 314 represents operations of the vehicle 104 ("Mining vehicle i" in FIG. 3).

A system discretization technique can be used by the central controller 106 to determine the traffic guidance. This technique can abstract a continuous model of the transportation network 200 and the vehicles 104 into a discrete model of the transportation network 200 and the vehicles 104, with the discrete model formed from a spatial discretization, a velocity discretization, and/or a temporal discretization of the transportation network 200 and/or the vehicles 104.

In one embodiment, the central controller 106 can discretize the transportation network 200 and movements of the vehicles 104 by dividing the areas of the transportation network 200 into separate areas, the allowable speeds of the vehicles 104 into designated velocity values, and/or the upcoming times over which the vehicles 104 are moving and/or performing assigned tasks into separate time periods. These separate areas and/or time periods may be non-overlapping areas and/or time periods. For example, the central controller 106 can divide the transportation network 200 into separate areas and can instruct the vehicles 104 of allowable areas of movement, speeds, turns, directions, or the like, for a first upcoming time period (e.g., one minute, ten minutes, one hour, one working shift, etc.). The central controller 106 can then change how the transportation network 200 is spatially divided up and/or change the allowable areas of movement, speeds, turns, directions, or the like, for the vehicles 104 for a subsequent, second time period. The second time period may be immediately subsequent to the first time period, or may be separated by a time delay. Optionally, the central controller 106 can keep the same areas into which the transportation network 200 is divided into and/or the allowable movements of the vehicles 104 for two or more time periods. Each time period can represent a "step" in a model of the discretized transportation network 200 and movements of the vehicles 104. The central controller 106 can determine several such steps to guide the vehicles 104 toward completion of the tasks assigned to the vehicles 104.

In one example of a spatial discretization shown in connection with the transportation network 200 in FIG. 2, the central controller 106 can divide the transportation network 200 into a set of regions of interest 204. The regions of interest 204 may not overlap each other in one embodiment. For example, the regions of interest 204 may be mutually exclusive such that no portion of a route 202 in one region of interest 204 can be in another region of interest 204. The regions of interest 204 can be manually selected or can be automatically determined without operator intervention. For example, the regions of interest 204 may be selected so that the number of vehicles 104 and/or tasks to be located within each region of interest 204 is the same as or within a designated range (e.g., 10%, 20%, or the like) of the other regions of interest 204.

In one aspect, the regions of interest 204 can be selected based on interdependencies of the tasks. The regions of interest 204 can be generated so that the tasks to be performed in one region of interest 204 do not rely on the performance of any task in another region of interest 204. For example, a first task may involve obtaining coal from a first location in a mine, a second task may involve placing the same coal at a different, second location in a mine, a third task may involve moving a battery pack for another vehicle 104 from a different, third location to a different, fourth location in the mine, and the like. Because the second task (placing the coal) relies on performance of the first task (obtaining the coal), at least one of the regions of interest 204 may be large enough to encompass the first and second locations of the first and second tasks. If the third task does not need for the first or second task to be performed before the third task is performed (or that the third task needs to be performed before the first or second tasks), then the regions of interest 204 may be generated so that the third task is in a region of interest 204 that is different from the region of interest 204 that includes the first and second tasks.

The divided regions of interest 204 can reflect modularity of the tasks being performed in the transportation network 200. For example, tasks in different regions of interest 204 may have little or dependency on each other, and thus each region of interest 204 can be treated as an individual sub-problem. This division helps to reduce the complexity of the entire problem, which is to determine what movements of the vehicles 104 are allowable for the vehicles 104 to complete the allocated tasks. Alternatively, the entire transportation network 200 may be a single region of interest 204. For example, instead of dividing a mine into smaller regions of interest 204, the entire mine can be treated as one region of interest 204. This may occur if the tasks to be completed have dependencies that do not allow for division of the network 200 into the regions of interest 204. The central controller 106 can divide the regions of interest 204 into smaller sub-regions, which also can be referred to as sections. The sections in a region of interest 204 may be non-overlapping sections, such that two sections include the same location or area. Alternatively, two or more of the sections may at least partially overlap.

Figure 4:
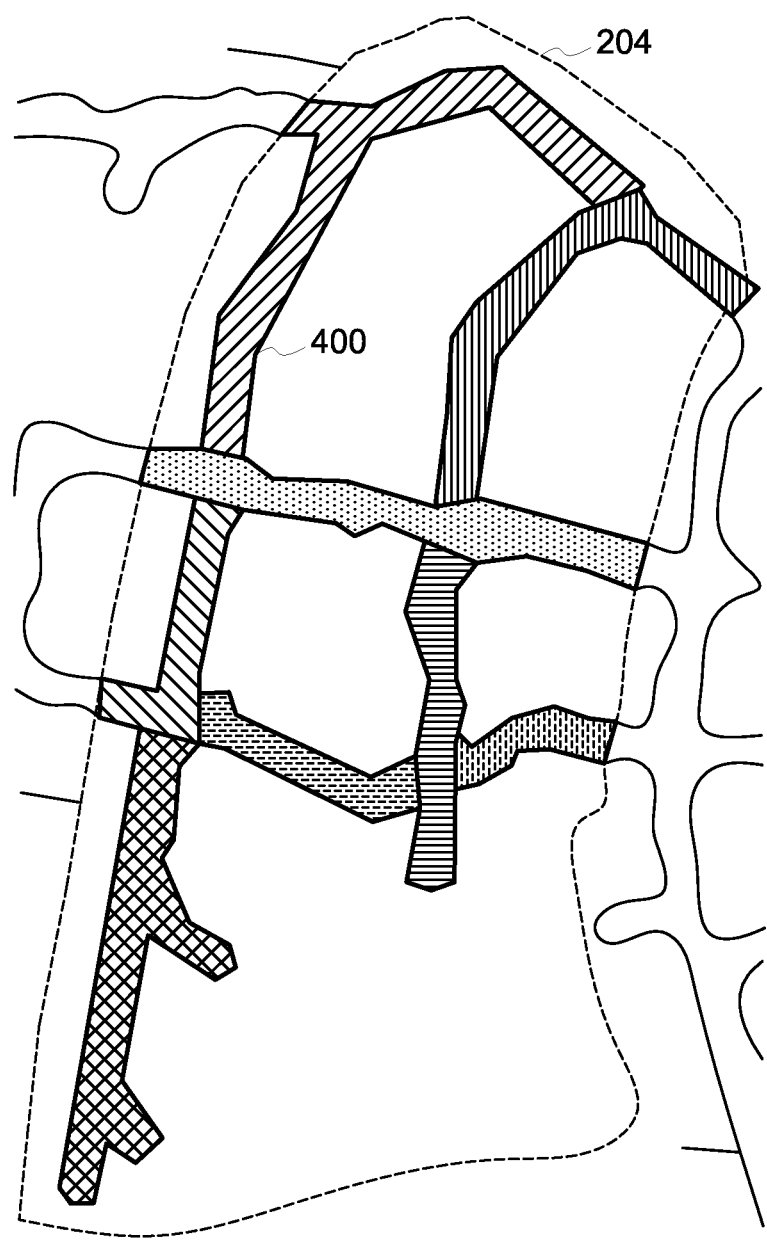
FIG. 4 illustrates one of regions of interest of the transportation network shown in FIG. 2 according to one example.

FIG. 4 illustrates one of the regions of interest 204 of the transportation network 200 shown in FIG. 2 according to one example. The region of interest 204 shown in FIG. 4 is divided by the central controller 106 into several non-overlapping sections 400. The sections 400 can be automatically defined by the central controller 106 and/or can be defined by input from an operator into the central controller 106. The sections 400 can represent different routes 202 of the transportation network 200, intersections 402 between two or more routes 202, routes 202 that provide access into and/or exit out of the region of interest 204 from another region of interest 204, or the like. In underground mining, the sections 400 can correspond to mine drifts, access tunnels, or the like.

The size and/or shape of a section 400 can be defined by user requirements, and can represent constraints on movements of the vehicles 104 (shown in FIG. 1) in performing the tasks. For example, the central controller 106 can define the sections 400 and/or provide traffic guidance 308 to the vehicles 104 such that only one vehicle 104 can appear in a section 400 at a time. This traffic guidance 308 may be formulated by the central controller 106 such that the allowable actions provided to the vehicle controllers 108 do not include any available options for two or more vehicles 104 to enter into and/or move within the same section 400 at the same time.

The central controller 108 can define the sections 400 such that the sections 400 are large enough to separate the vehicles 104 by at least a designated safety distance to prevent unsafe situations (e.g., vehicle conflicts). For example, if the vehicles 104 are to remain at least thirty meters from each other, then the sections 400 can be selected so that the vehicle 104 in one section 400 will always be at least thirty meters from vehicles 104 in any part of neighboring sections 400 (e.g., sections 400 that directly abut each other). The central controller 108 may define the sections 400 to be smaller than an upper size threshold. Making the sections 400 too large can unduly restrict allowable movements of the vehicles 104. The sections 400 of a region of interest 204 discretize the space of the transportation network 200, as well as the positions of the vehicles 104. As a result, the position of a vehicle 104 can be represented by a discrete variable that represents a section 400 in the central controller 106.

With respect to velocity discretization of the movements of the vehicles 104 in the transportation network 200, the central controller 106 can separate a range of velocities of the vehicles 104 into smaller velocity steps or values. For example, the central controller 106 can define a first velocity value as zero meters per second (m/s), a second velocity value as 0.5 m/s, a third velocity value as one m/s, and so on. Alternatively, other values may be used and/or the central controller 106 can define ranges of velocity values for the vehicles 104, such as zero to 0.5 m/s, 0.6 m/s to 1 m/s, and so on. The central controller 106 can then provide the traffic guidance 308 to the vehicle controllers 108 that defines the allowable velocity value or values that a vehicle 104 is permitted to travel according to during an upcoming or current step (e.g., an upcoming time period) in the model of the transportation network 200. In one embodiment, the central controller 106 does not generate or communicate control commands to the vehicle controllers 108 that define a single speed, throttle setting, brake setting, direction of movement, or the like. Instead, the central controller 106 can provide several different options of speeds, different options of throttle settings, different options of brake settings, different options of directions of movement, or the like, that the operator of the vehicle may choose from. The velocity values sent from the central controller 106 may be scalar. With respect to a mine, by exploiting the constraints of a mine layout, changes in direction may be modeled separately without requiring a generalization of velocity as a vector, thus keeping the complexity of the model of the network 200 bounded.

The time periods defined by the central controller 106 discretize the time of the model of the transportation network 200. These time periods represent time epochs when the state of the vehicles 104 are determined (e.g., sampled) and traffic guidance 308 is issued to the vehicles 104. For example, with respect to the structure 300 shown in FIG. 3, the vehicle controller 108 (represented by the third level 310) can monitor, receive, or otherwise determine a status of the vehicle 104 as monitored vehicle status 316 ("vehicle i status" in FIG. 3). The vehicle status 316 can indicate the state of energy and/or fuel storage in the vehicle 104, current capacity of the vehicle 104, speed of the vehicle 104, direction of movement of the vehicle 104, location of the vehicle 104, or the like. The vehicle status 316 can be provided to the vehicle controller 108 from the vehicle 104. The vehicle status 316 and/or bids for tasks (as described below) can be communicated from the vehicle controller 108 to the central controller 106 as status updates 318 ("vehicle i status and task bid" in FIG. 3).

Based on the status updates 318 that are received, the central controller 106 can monitor the vehicles 104. The central controller 106 can track locations of the vehicles 104, completed tasks of the vehicles 104, progress toward task completion of the vehicles 104, movements of the vehicles 104, and the like, such that the central controller 106 is able to determine current locations and statuses of the vehicles 104. The vehicle controllers 108 may report locations of the vehicles 104 to the central controller 106, such as by the vehicle controllers 108 wirelessly communicating with stationary devices disposed alongside routes in the transportation network (e.g., radio frequency identification (RFID) readers, RFID transponders, or the like), the vehicle controllers 108 using cellular triangulation, or the like, to determine locations of the vehicles 104. Optionally, the operators may notify the central controller 106 of the locations of the vehicles 104 via the vehicle controllers 108. Additionally or alternatively, the central controller 106 can receive statuses from the vehicle controllers 108 that report speeds and/or last known positions of the vehicles. The central controller 106 can calculate or estimate current locations of the vehicles based on these statuses and/or changes in the statuses. The vehicle controllers 108 also may report back on the progress of completing the tasks assigned to the vehicles 104, based on input from the operators, locations of the vehicles 104 (e.g., where a location of a vehicle 104 at an assigned task indicates continuing work on the task, a location of the vehicle 104 moving away from the assigned task indicates completion of the task, and the like). The status updates 318 optionally may include alarms (e.g., fault alarms of the vehicles 104).

The vehicles 104 can send updated statuses to the central controller 106, which can include positions, states of energy, remaining capacities, and the like, of the vehicles 104. The central controller 106 monitors the received vehicle status and provides updated traffic guidance 308 to the vehicles 104. The central controller 106 can use the discretized model of the transportation network 200 and vehicles 104 to synthesize movements of the vehicles 104. In one embodiment, the central controller 106 synthesizes the movements of the vehicles 104 using supervisory controller synthesis techniques. For example, in one aspect, central controller 106 can update the model in each epoch such that the solution to the model (e.g., the allowable movements options that are determined and sent to the vehicle controllers 108) is proven to be correct in that implementation of any of these movement options by the vehicles will not result in vehicles colliding with each other or blocking each other.

Based on the models and the statuses of the vehicles 104, the central controller 104 can determine and communicate the traffic guidance 308 to the vehicles 104, with the traffic guidance 308 representing or including a set of legal actions that the vehicles 104 can take during an upcoming or current time period. The set of legal actions sent to a vehicle 104 can include the allowable movements of the vehicle 104. For example, a set of legal actions can include a first option to move along a first route 200 at a first velocity value in a first direction, a second option to move along the same first route 200 at a different, second velocity value in the same first direction, a third option to move along the same first route 200 at the first velocity value in the first direction and turn into a different, second route 202, and a fourth option to move along the second route 202 at a third velocity value. The vehicle 104 and/or operator may then select which option to implement. For example, the operator and/or vehicle 104 may select the first, second, third, or fourth option from the set, but may not select an option that is not included in the set of legal actions received by the vehicle controller 108 from the central controller 106. The operator may not be permitted to move along another route, at another velocity value, or the like, if that movement is not included in the set of allowable actions. The operator and/or vehicle 104 may be prevented from moving in a manner that is inconsistent with the legal actions included in the set received by the vehicle controller 108 by the vehicle controller 108 determining if the vehicle 104 is moving according to one or more of the allowable options and, if not, the vehicle controller 108 can autonomously warn the operator, command the vehicle 104 to stop movement, or the like.

In one aspect, the set of allowable actions sent to a vehicle 104 restrict movement of that vehicle 104 to within a single section during the current or upcoming epoch of the model. Alternatively, the set of allowable actions may include at least one action that, if selected for implementation, results in the vehicle 104 leaving one section for another section of the model. The sets of actions sent to two or more vehicles 104 may be coordinated with each other and/or based on each other. For example, during a first time period or epoch of the model of the transportation network and vehicles, a first vehicle may be disposed in a first section of the network and a second vehicle may be disposed in a different, second section of the network. First and second sets of actions for the corresponding first and second vehicles may be generated to include actions that cause the first vehicle to enter into the second section, but only after (and/or if) the second vehicle leaves the second section.

The traffic guidance 308 may include several options for the vehicles 104 such that the central controller 106 does not dictate movements of the vehicles 104, but instead provides the vehicles 104 with several options of movement such that the vehicles 104 are free to decide how to move subject to the limits of the options provided. In one aspect, the central controller 106 may form the traffic guidance 308 to represent all allowable actions that may be taken by different vehicles 104 during the next step or epoch of the model of the network 200, which is different from a control-based approach where a vehicle can be provided with a single instance of legal behavior for a next step. In one embodiment, the central controller 106 may provide the vehicle controllers 108 with each allowable option for movement for each vehicle during an upcoming epoch of the model.

The vehicle controller 108 can adopt a greedy-based process to determine which action to select form the set of allowable actions. For example, the vehicle controller 108 may select the action that causes the vehicle 104 to complete the task faster than other actions, to complete more of the task than other actions, to consume less energy than other actions, or the like.

Upon selection of an option by the vehicle 104 and/or operator, an operator response message 320 (shown in FIG. 3) representative of the selected option is communicated from the vehicle controller 108 to the central controller 106 (e.g., to the second level 304 representative of the traffic guidance module of the central controller 106). The option may be selected by an operator providing input to the vehicle controller 108 (e.g., selecting an option from a displayed list), the operator controlling the vehicle 104 according to one of the options, or the like. Responsive to receiving the operator responses 320 from one or more, or all, of the vehicles 104, the traffic guidance module can communicate a system status message 322 to the dispatcher module of the central controller 106, as shown in FIG. 3. The system status message 322 indicates the current state of the transportation network 200 and the vehicles 104 based on the operator responses 320.

The allowable or legal actions provided to the vehicle controllers 108 may be determined based on the state of the transportation network 200, the state of the vehicles 104, and/or the tasks assigned to the vehicles 104. For example, the central controller 106 can identify different actions that allow several vehicles 104 to concurrently move toward and/or work on completion of tasks, without the vehicles 104 colliding, blocking movement of other vehicles 104, or otherwise prevent movement of other vehicles 104 and/or task completion by other vehicles 104. As the vehicles 104 select from and move according to legal actions provided to the vehicles 104 during a first time epoch, the central controller 106 can determine additional legal actions that can be taken by the vehicles 104 for a subsequent, second time epoch. The central controller 106 can repeat the monitoring of the states of the transportation network 200 and the vehicles 104, determining allowable actions by the vehicles 104, communicating the sets of allowable actions to the vehicles 104, and receiving responses 320 from the vehicles 104 for additional time periods so that the vehicles 104 are guided toward completion of the assigned tasks.

By using discretization on the model of the system that includes the transportation network 200 and the dynamics of vehicles 104, this system is defined as a discrete-event model. The model of the system changes states, with each state corresponding to the discretized system status of interest (e.g., vehicle section and vehicle velocity). Transitions of the model correspond to the events of interest, such as when a vehicle moves from one section to another, a vehicle changes velocity, or the like. Using a discretized system can reduce the computational complexity of synthesizing control of the vehicles as compared to a continuous system, which may require determining and communicating directives to the vehicles more often. Such a discretized system also can enable the central controller to be synthesized.

Figure 5:
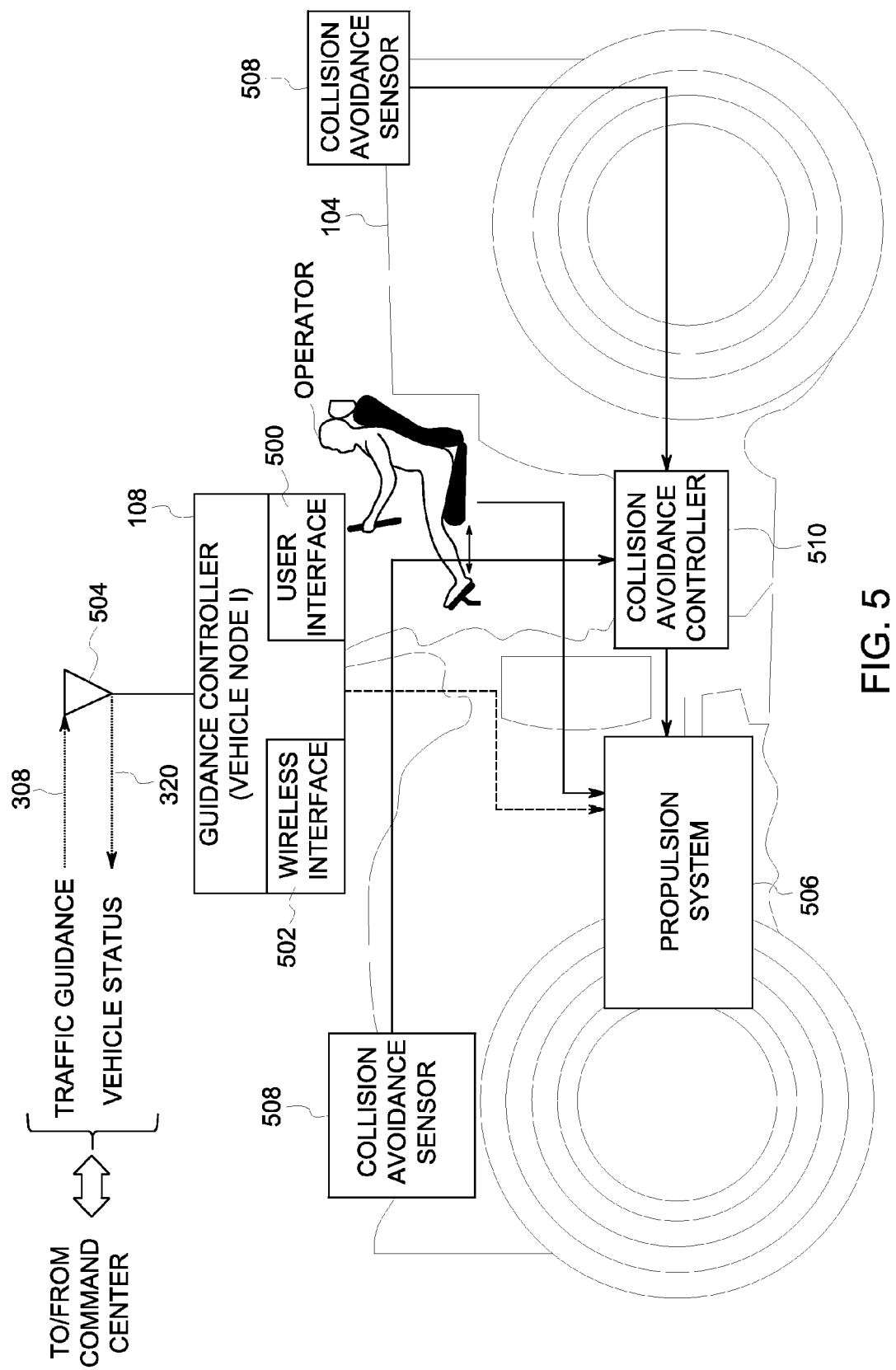
FIG. 5 illustrates one embodiment of the vehicle shown in FIG. 1.

FIG. 5 illustrates one embodiment of the vehicle 104 shown in FIG. 1. The vehicle 104 includes the vehicle controller 108 disposed onboard the vehicle 104 ("Guidance Controller (Vehicle Node i)" in FIG. 5), which may include an output device 500 ("User Interface"), such as a display, monitor, touchscreen, or the like. The vehicle controller 108 can include wireless transceiving circuitry and associated hardware for wireless communication with the central controller 106 and/or other vehicles 104, represented by a wireless interface 502 and antenna 504 in FIG. 5. As described above, traffic guidance 308 can be received from the central controller 106 via the transceiving circuitry and presented to the operator on the user interface 500. The vehicle controller 108 can determine the action selected by the operator and/or vehicle 104 from the allowable actions in the traffic guidance 308, and report the selected action (and/or other status information of the vehicle 104) to the central controller 106 as the operator response 320 ("Vehicle status" in FIG. 5).

In one embodiment, the vehicle controller 108 may automatically control operations of the vehicle 104 responsive to an allowable action being selected by the operator from the traffic guidance 308. The vehicle controller 108 can be communicatively coupled with a propulsion system 506 of the vehicle 104, which can include one or more traction motors, engines, brakes, steering wheels and associated mechanisms, or the like, of the vehicle 104.

The vehicle controller 108 can generate command signals that are communicated to the propulsion system 506 to automatically implement the selected action. The signals can cause the propulsion system 506 to steer the vehicle 104 in a direction designated by the selected action, move the vehicle 104 at a speed designated by the selected action, and the like. In the event that the operator begins manually controlling the vehicle 104 in a manner that differs from the selected action (e.g., turns a steering wheel in a different direction, applies brakes, speeds up or slows down, etc.), the propulsion system 506 may convert to manual control and disregard the autonomous control or attempt to control the vehicle 104 by the vehicle controller 108. In another embodiment, the vehicle controller 108 may automatically select the action to implement and/or automatically control the vehicle 104 according to the selected action.

Several collision avoidance sensors 508 may be provided on the vehicle 104 and be communicatively connected with a collision avoidance controller 510 of the vehicle 104. The sensors 508 generate data representative of how far or close the vehicle 104 is to other objects (e.g., walls, other vehicles 104, etc.) and/or determine when the vehicle 104 is within a designated distance from another object. Responsive to the data from the sensor 508 and/or the sensor 508 determining that the vehicle 104 is less than this designated distance, an alarm signal may be generated by the sensor 508 and/or the controller 510. Responsive to receiving this alarm signal at the vehicle controller 108 and/or the propulsion system 506, automatic control and/or operator control of the vehicle 104 may terminate and one or more remedial actions may be implemented. For example, brakes of the vehicle 104 may be applied, an audible alarm may be generated, or the like. The sensors 508 can represent proximity sensors, such as radar sensors, sonar sensors, light sensors (e.g., that measure distances based on the reflection of light), global positioning system receivers, or the like. The controller 510 represents hardware circuits or circuitry that include and/or are connected with one or more processors.

As described above, the tasks can be allocated among the vehicles 104 based on an auction. In such an auction, the vehicles 104 can submit bids for various tasks by communicating bid signals from the vehicle controller 108 to the central controller 106. These bid signals can include data representative of capacities and statuses of the vehicles 104. For example, a bid from a vehicle 104 may indicate how much material, cargo, passengers, etc. that the vehicle 104 can carry, a location of the vehicle 104, a time to finish a current task of the vehicle 104 (e.g., a time until the vehicle 104 is available for the next task), a time to finish a task being bid on (which may be a designated and previously defined time period associated with the task), a current state of energy and/or fuel stored on the vehicle 104, or other information. The central controller 106 can examine the requirements of a task (e.g., how much material, cargo, passengers, etc. are to be carried, the location of the task, how quickly the task needs to be completed, how much energy is required to complete the task, and the like, and compare these task requirements to the bids from multiple vehicles 104. The vehicle 104 or vehicles 104 having sufficient capacity, time, energy, or the like, to meet or exceed the task requirements may be considered by the central controller 106 to receive the task. Of those vehicles 104, the vehicles 104 that can complete the task the fastest and/or that can complete the task without blocking or colliding with other vehicles 104 may be assigned the task. Alternatively, another type of process may be used to allocate the tasks.

Figure 6A:
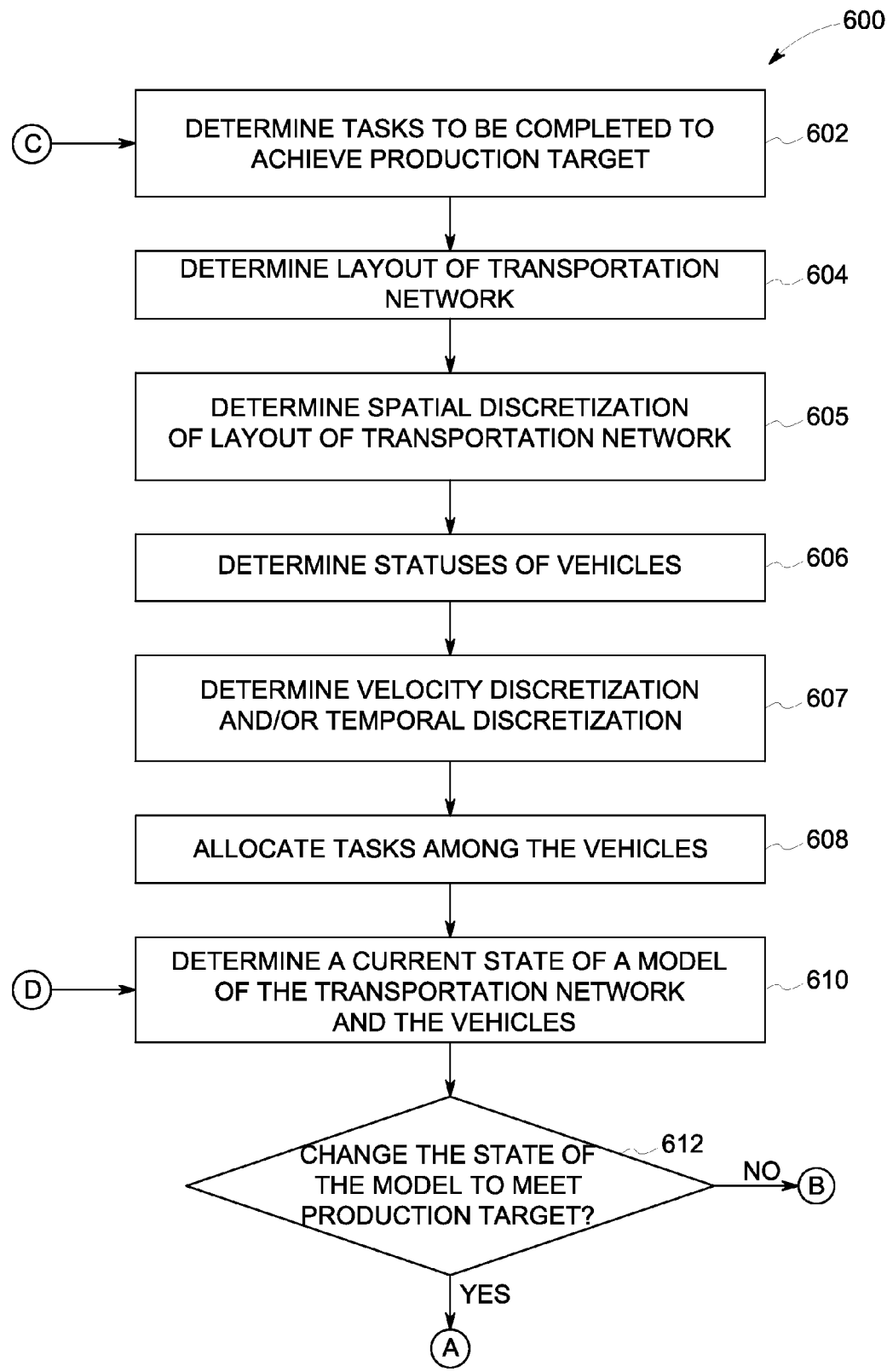
FIGS. 6A and 6B illustrate a flowchart of one embodiment of a method for guiding and coordinating vehicular traffic.
Figure 6B:
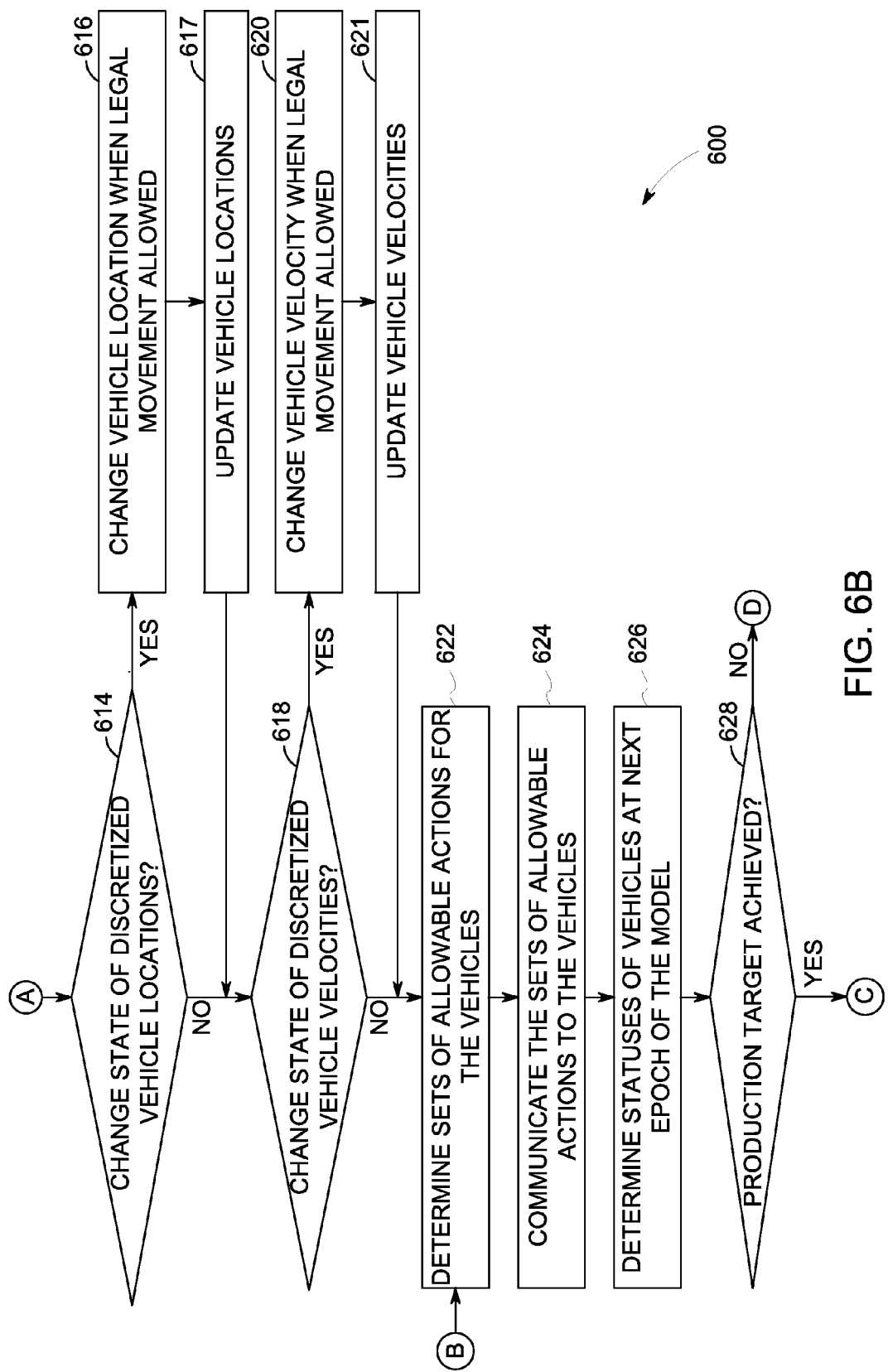

FIGS. 6A and 6B illustrate a flowchart of one embodiment of a method 600 for guiding and coordinating vehicular traffic. The method 600 may be performed by one or more embodiments of the systems described herein, such as by the system 100 and/or central controller 106 shown in FIG. 1. At 602, tasks that need to be performed to achieve a production target are determined. The production target may represent an amount of material to be removed from a mine, a number of persons to transport between various locations, or another goal to be achieved by completing several tasks using two or more vehicles. At 604, the layout of a transportation network in which the tasks are to be performed is determined. This layout can represent the relative locations, orientations, or the like, of routes that form the transportation network, grades of the routes, curvatures of the routes, locations of equipment in the network, etc.

At 605, a spatial discretization of the layout of the transportation network is determined. For example, the routes that make up the transportation network may be divided into separate regions of interests and/or sections, as described above.

At 606, statuses of vehicles that will perform at least some of the tasks are determined. These statuses can indicate locations of the vehicles, carrying capacities of the vehicles, amounts of fuel and/or energy stored in the vehicles, or other information.

At 607, a velocity discretization and/or temporal discretization of a model of the transportation network and the vehicles are determined. For example, discrete values of velocities that the vehicles may be permitted to travel can be identified and/or time periods or epochs at which the model of the transportation network and/or vehicles are updated can be identified. These velocities and/or time periods can be selected from a list of previously identified velocity values and/or time periods, may be manually customizable, or may be otherwise determined.

At 608, the tasks are allocated among the vehicles based at least in part on requirements of the tasks and the statuses of the vehicles. As described above, an auction system may be used to allocate the tasks, or other technique may be used.

At 610, a current state of a model of the transportation network and the vehicles is determined. This state can represent the locations of the vehicles, the locations where the tasks are to be performed, previously defined regions of interest and/or sections of the transportation network, and the like, for a current or previous epoch of the model. At 612, a determination is made as to whether the state of the transportation network needs to change. The locations of the vehicles may be compared to each other and the locations of the tasks, the layout of the transportation network and the previously defined regions of interest and sections may be examined, in order to determine if the discretized areas of the transportation network and/or the discretized velocities of the vehicles need to be changed to allow for the vehicles to perform the allocated tasks. For example, if a vehicle is assigned a task that would require the vehicle to travel into another region of interest and/or into another section currently occupied by another vehicle, then the state of the discretized vehicle locations may need to be changed so that the vehicle can travel to and complete the task. As another example, if a vehicle assigned to a task cannot travel fast enough according to a current velocity value to reach and complete a task within a designated time period associated with the task, then the velocity value of that vehicle may need to be changed. As a result, flow of the method 600 can proceed to 614. On the other hand, if the tasks can be completed with the current vehicle locations and current vehicle velocities, then flow of the method 600 can proceed to 622.

At 614, a determination is made as to whether the state of discretized vehicle location needs to be changed. If the states of vehicle locations in the current epoch of the model do not allow for the vehicles to travel to the locations of the tasks allocated to the respective vehicles, then these states of vehicle locations may need to be changed. As a result, flow of the method 600 can proceed to 616. On the other hand, if the current states of vehicle locations do allow for the vehicles to travel to the locations of the tasks, then the states of vehicle locations may not need to be altered. As a result, flow of the method 600 can proceed to 618.

At 616, the vehicle location is changed when a legal movement is allowed by the central controller. The locations of the vehicles can be changed by providing the vehicles with options on where to move, subject to a condition that the options are allowable in that the options do not cause vehicles to collide or block each other. In one embodiment, the vehicle locations can be changed by altering the size, shape, and/or number of the regions of interest in the transportation network, and/or by altering the size, shape, and/or number of the sections in one or more of the regions of interest. The regions of interest and/or sections may be changed so that the vehicles are allowed to move to the locations of the tasks allocated to the respective vehicles. Flow of the method 600 may then proceed to 617. At 617, the locations of the vehicles are updated. For example, the central controller may determine the new locations of the vehicles.

At 618, a determination is made as to whether the state of discretized vehicle velocity needs to be changed. If the velocity values of the vehicles in the current epoch of the model do not allow for the vehicles to travel to the locations of the tasks allocated to the respective vehicles (e.g., within designated periods of time), then these velocity values may need to be changed. As a result, flow of the method 600 can proceed to 620. On the other hand, if the current velocity values do allow for the vehicles to travel to the locations of the tasks (e.g., within the designated periods of time), then the velocity values of the vehicles may not need to be altered. As a result, flow of the method 600 can proceed to 622.

At 620, the vehicle velocity is changed when a legal velocity change is allowed by the central controller. A vehicle velocity can be changed by providing the vehicle controllers with options to accelerate, decelerate, updated velocity values assigned to the vehicles, etc., subject to a condition that the new velocity values do not cause the vehicles to collide or block one another if selected for implementation. The velocity values may be changed so that the vehicles are allowed to move to the locations of the tasks allocated to the respective vehicles within the designated periods of time. Flow of the method 600 may then proceed to 621. At 621, the velocities of the vehicles are updated. For example, the central controller may determine the new velocities of the vehicles.

At 622, sets of allowable actions for the vehicles are determined based on the updated vehicle statuses. These sets of allowable actions can be determined by examining the states of the vehicles, the spatial discretization of the transportation network, the velocity discretization of the vehicles, the locations of the tasks, and the like, to determine possible movements by the vehicles that can move the vehicles toward the tasks and/or completion of the tasks while avoiding collisions between vehicles (e.g., directing two or more vehicles along the same route at the same time) and/or one vehicle blocking movement of another vehicle. Out of many possible actions that a vehicle can implement, those actions that do not move the vehicle toward a task, do not further progress on completion of the task, cause the vehicle to collide with another vehicle, or cause the vehicle to block movement of another vehicle working on another task, are eliminated from contention. The remaining actions may then be included in the set of allowable actions for that vehicle. Several different sets of allowable actions may similarly be determined for other vehicles.

At 624, the sets of allowable actions are communicated to the corresponding vehicles. The vehicles and/or operators of the vehicles may then select which of the allowable actions to implement, as described above. At 626, statuses of the vehicles are determined at a subsequent epoch of the model of the transportation network and/or vehicles. For example, after a designated period of time, after tasks are completed, or after vehicles have moved to the edge of the sections and/or regions of interest of the transportation network, the state of the model may change. Changes in the state of the model can represent a subsequent epoch of the model. The statuses of the vehicles can be determined responsive to determining that the state of the model has changed.

At 628, a determination is made as to whether the production target has been achieved. For example, a determination may be made as to whether the tasks of the current production target have been completed within a designated time period. If not, flow of the method 600 can return to 610 to examine and/or change the states of the model of the transportation network and vehicles in order to continue to work toward completion of the production target. On the other hand, if the production target has been achieved, then flow of the method 600 may return to 602 in order to determine tasks of a new production target. Alternatively, the method 600 may terminate.

Components of the system 100 described herein may include or represent hardware circuits or circuitry that include and/or are connected with one or more processors, such as one or more computer microprocessors. The operations of the methods described herein and the system 100 can be sufficiently complex such that the operations cannot be mentally performed by an average human being or a person of ordinary skill in the art within a commercially reasonable time period. For example, the allocation of tasks, spatial discretization of the transportation network 200, velocity discretization of the vehicles 104, determining sets of allowable actions for multiple vehicles, updating of vehicle statuses, and the like, may take into account a large amount of factors, may rely on relatively complex computations, may involve examination of many permutations of different potential allocations of tasks, different potential sets of allowable actions, different divisions of the transportation network, different velocity values, and the like, such that such a person cannot complete the allocation of tasks and discretization of the transportation network and/or vehicles within a commercially reasonable time period to have the task allocations, regions of interest, sections, velocity values, and the like, ready for the frequent actions of the vehicles. The hardware circuits and/or processors of the system may be used to significantly reduce the time needed to determine the task allocations, regions of interest, sections, velocity values, and the like, such that these the task allocations, regions of interest, sections, velocity values, and the like, can be generated within commercially reasonable time periods.

In one embodiment, a method (e.g., for guiding and coordinating vehicular traffic) includes determining tasks to be completed by mining vehicles in a mine formed by plural interconnected mining routes in order to complete an economic objective. The economic objective includes one or more of removing a first amount of material from the mine that is associated with at least a designated amount of financial revenue, moving at least a second amount of the material from the mine that is associated with a designated amount of mining throughput, and/or keeping operational costs associated with the mining vehicles completing the tasks below a designated financial cost threshold. The method also includes receiving (at a central controller that is off-board the mining vehicles) bid signals from the mining vehicles. The bid signals are representative of one or more of current statuses of the mining vehicles or capacities of the mining vehicles to perform the tasks. The method also includes allocating the tasks to be completed by the mining vehicles in the mine among the mining vehicles. The tasks can be allocated based at least in part on the bid signals received from the mining vehicles, and can be allocated such that the economic objective is scheduled to be achieved by the mining vehicles by completing the tasks as allocated. The method also can include determining respective sets of allowable actions for the mining vehicles based at least in part on the tasks as allocated among the vehicles. The set of allowable actions for each mining vehicle can include plural different allowable actions that the mining vehicle is allowed to perform in order to complete the task or the tasks allocated to the mining vehicle. The sets of allowable actions for the mining vehicles can be determined such that the mining vehicles are scheduled to complete the tasks and complete the economic objective without two or more of the mining vehicles colliding or blocking each other. The method also can include communicating the sets of allowable actions to the mining vehicles such that the mining vehicles are permitted to select one or more of the allowable actions in the sets communicated to the respective mining vehicles and prohibited from performing one or more other actions. The method may further include updating statuses of the mining vehicles at the central controller responsive to the mining vehicles operating according to one or more of the allowable actions in the sets of allowable actions communicated to the mining vehicles, and determining an updated set of allowable actions for one or more of the mining vehicles based at least in part on the tasks as allocated among the vehicles and the statuses of the mining vehicles that are updated. The updated set of allowable actions for the one or more mining vehicles can be determined such that the mining vehicles are scheduled to complete the tasks and complete the economic objective without two or more of the mining vehicles colliding or blocking each other. The method also can include communicating the updated set of allowable actions to the one or more mining vehicles.

In one aspect, the method can include spatially discretizing the mining routes into separate, non-overlapping regions of interest, where the set of allowable actions is determined for each mining vehicle to prevent the mining vehicle receiving the set of allowable actions from leaving the region of interest in which the mining vehicle is located during performance of the task or the tasks allocated to the mining vehicle.

In one aspect, the method also can include spatially discretizing the regions of interest into one or more non-overlapping spatial sections. The set of allowable actions can be determined for each mining vehicle to prevent the mining vehicle receiving the set of allowable actions from leaving a selected section of the one or more sections during performance of the task or the tasks allocated to the mining vehicle.

In one aspect, the mining routes can be spatially discretized into the regions of interest based on interdependencies of the tasks allocated to the mining vehicles such that a first task that relies on completion of a second task are included in a first region of interest and other tasks that do not rely on completion of the first task or the second task are included in other regions of interest in the tasks as allocated to the mining vehicles.

In one aspect, the method can include discretizing velocities of the mining vehicles into different designated velocity values, where the set of allowable actions is determined for each mining vehicle to designate two or more of the designated velocity values as speeds that the mining vehicle receiving the set of allowable actions is permitted to move during performance of the task or tasks allocated to the mining vehicle.

In another embodiment, a method (e.g., for guiding and coordinating vehicular traffic) includes determining tasks to be completed by vehicles in a transportation network formed by plural interconnected routes in order to complete an objective, allocating the tasks to be completed by the vehicles in the transportation network among the vehicles, and determining sets of allowable actions for the vehicles based at least in part on allocation of the tasks. The sets of allowable actions dictate plural different allowable actions that the vehicles are allowed to perform in order to complete the task or the tasks allocated to the vehicles. The sets of allowable actions are determined such that the vehicles are scheduled to complete the tasks and complete the objective without two or more of the vehicles colliding or blocking movement of each other. The method also can include communicating the sets of allowable actions to the vehicles such that the vehicles are permitted to select one or more of the allowable actions in the sets communicated to the respective vehicles and prohibited from performing one or more other actions during performance of the tasks allocated to the vehicles.

In one aspect, the method also can include updating statuses of the vehicles at a central controller responsive to the vehicles operating according to one or more of the allowable actions in the sets of allowable actions communicated to the vehicles, and determining an updated set of allowable actions for one or more of the vehicles based at least in part on the tasks as allocated to the vehicles and the statuses of the vehicles that are updated. The updated set of allowable actions for the one or more vehicles can be determined such that the vehicles are scheduled to complete the tasks and complete the objective without two or more of the vehicles colliding or blocking each other.

In one aspect, the vehicles are mining vehicles and the transportation network is a mine.

In one aspect, the objective is an economic objective including one or more of removing a first amount of cargo from a location that is associated with at least a designated amount of financial revenue, moving at least a second amount of the cargo that is associated with a designated amount of throughput, and/or keeping operational costs associated with the vehicles completing the tasks below a designated financial cost threshold.

In one aspect, allocating the tasks among the vehicles includes receiving (at a central controller that is off-board the vehicles) bid signals from the vehicles that are representative of one or more of current statuses of the vehicles or capacities of the vehicles to perform the tasks, comparing the one or more of current statuses or capacities of the vehicles to requirements of the tasks, and allocating the tasks among the vehicles based on a comparison between the requirements of the tasks and the bid signals received from the vehicles.

In one aspect, the sets of allowable actions are determined to direct the vehicles to concurrently move according to the allowable actions in the sets.

In one aspect, the method also can include spatially discretizing the routes into separate, non-overlapping regions of interest, where the sets of allowable actions are determined for the vehicles to prevent the vehicles receiving the sets of allowable actions from leaving the regions of interest in which the vehicles are located during performance of the tasks allocated to the vehicles.

In one aspect, the method also can include spatially discretizing the regions of interest into one or more non-overlapping spatial sections, where the sets of allowable actions are determined for the vehicles to prevent the vehicles from leaving respective sections of the one or more sections during performance of the tasks allocated to the vehicles.

In one aspect, the routes are spatially discretized into the regions of interest based on interdependencies of the tasks allocated to the vehicles such that a first task that relies on completion of a second task are included in a first region of interest and other tasks that do not rely on completion of the first task or the second task are included in other regions of interest in the tasks as allocated among the vehicles.

In another embodiment, a system (e.g., a vehicular coordination and guidance system) includes a controller configured to determine tasks to be completed by vehicles in a transportation network formed by plural interconnected routes in order to complete an objective. The controller also is configured to allocate the tasks to be completed by the vehicles in the transportation network among the vehicles and to determine sets of allowable actions for the vehicles based at least in part on allocation of the tasks. The sets of allowable actions dictate plural different allowable actions that the vehicles are allowed to perform in order to complete the task or the tasks allocated to the vehicles, where the sets of allowable actions are determined such that the vehicles are scheduled to complete the tasks and complete the objective without two or more of the vehicles colliding or blocking movement of each other. The controller also can be configured to communicate the sets of allowable actions to the vehicles such that the vehicles are permitted to select one or more of the allowable actions in the sets communicated to the respective vehicles and prohibited from performing one or more other actions during performance of the tasks allocated to the vehicles.

In one aspect, the controller also is configured to receive updated statuses of the vehicles responsive to the vehicles operating according to one or more of the allowable actions in the sets of allowable actions communicated to the vehicles and to determine an updated set of allowable actions for one or more of the vehicles based at least in part on the tasks as allocated to the vehicles and the statuses of the vehicles that are updated. The updated set of allowable actions for the one or more vehicles can be determined such that the vehicles are scheduled to complete the tasks and complete the objective without two or more of the vehicles colliding or blocking each other.

In one aspect, the objective can be an economic objective including one or more of removing a first amount of cargo from a location that is associated with at least a designated amount of financial revenue, moving at least a second amount of the cargo that is associated with a designated amount of throughput, and/or keeping operational costs associated with the vehicles completing the tasks below a designated financial cost threshold.

In one aspect, the controller can be configured to allocate the tasks among the vehicles by receiving bid signals from the vehicles that are representative of one or more of current statuses of the vehicles or capacities of the vehicles to perform the tasks, comparing the one or more of current statuses or capacities of the vehicles to requirements of the tasks, and allocating the tasks among the vehicles based on a comparison between the requirements of the tasks and the bid signals received from the vehicles.

In one aspect, the controller can be configured to spatially discretize the routes into separate, non-overlapping regions of interest, where the sets of allowable actions are determined for the vehicles to prevent the vehicles receiving sets of allowable actions from leaving the regions of interest in which the vehicles are located during performance of the tasks allocated to the vehicles.

In one aspect, the routes can be spatially discretized by the controller into the regions of interest based on interdependencies of the tasks allocated to the vehicles such that a first task that relies on completion of a second task are included in a first region of interest and other tasks that do not rely on completion of the first task or the second task are included in other regions of interest in the tasks as allocated among the vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method for guiding and coordinating vehicular traffic, the method comprising:
    determining tasks to be completed by mining vehicles in a mine formed by plural interconnected mining routes in order to complete an objective, the objective including one or more of removing a first amount of material from the mine or moving at least a second amount of the material from the mine that is associated with a designated amount of mining throughput;
    receiving, at a central controller that is off-board the mining vehicles, status signals from the mining vehicles, the status signals representative of one or more of current statuses of the mining vehicles or capacities of the mining vehicles to perform the tasks;
    allocating the tasks to be completed by the mining vehicles in the mine among the mining vehicles, the tasks allocated based at least in part on the status signals received from the mining vehicles, the tasks allocated such that the objective is scheduled to be achieved by the mining vehicles by completing the tasks as allocated;
    determining respective sets of one or more allowable areas of movement, speeds, turns, or directions of movement for the mining vehicles based at least in part on the tasks as allocated among the mining vehicles, the set of one or more allowable areas of movement, speeds, turns, or directions of movement for each mining vehicle including one or more plural different allowable areas of movement, speeds, turns, or directions of movement that the mining vehicle is allowed to perform in order to complete the task or the tasks allocated to the mining vehicle, wherein the sets of one or more allowable areas of movement, speeds, turns, or directions of movement for the mining vehicles are determined such that the mining vehicles are scheduled to complete the tasks and complete the objective without two or more of the mining vehicles colliding or blocking each other;
    communicating the sets of one or more allowable areas of movement, speeds, turns, or directions of movement to the mining vehicles such that the mining vehicles are permitted to select one or more of the allowable areas of movement, speeds, turns, or directions of movement in the sets communicated to the respective mining vehicles and prohibited from performing one or more other areas of movement, speeds, turns, or directions of movement;
    updating statuses of the mining vehicles at the central controller responsive to the mining vehicles operating according to one or more of the allowable areas of movement, speeds, turns, or directions of movement in the sets of one or more allowable areas of movement, speeds, turns, or directions of movement communicated to the mining vehicles;
    determining an updated set of one or more allowable areas of movement, speeds, turns, or directions of movement for one or more of the mining vehicles based at least in part on the tasks as allocated among the mining vehicles and the statuses of the mining vehicles that are updated, wherein the updated set of the one or more allowable areas of movement, speeds, turns, or directions of movement for the one or more mining vehicles is determined such that the mining vehicles are scheduled to complete the tasks and complete the objective without two or more of the mining vehicles colliding or blocking each other; and
    communicating the updated set of the one or more allowable areas of movement, speeds, turns, or directions of movement to the one or more mining vehicles.

2. The method of claim 1, further comprising spatially discretizing the mining routes into separate, non-overlapping regions of interest, wherein the set of one or more allowable areas of movement, speeds, turns, or directions of movement is determined for each mining vehicle to prevent the mining vehicle receiving the set of one or more allowable areas of movement, speeds, turns, or directions of movement from leaving the region of interest in which the mining vehicle is located during performance of the task or the tasks allocated to the mining vehicle.

3. The method of claim 2, further comprising spatially discretizing the regions of interest into one or more non-overlapping spatial sections, wherein the set of one or more allowable areas of movement, speeds, turns, or directions of movement is determined for each mining vehicle to prevent the mining vehicle receiving the set of one or more allowable areas of movement, speeds, turns, or directions of movement from leaving a selected section of the one or more sections during performance of the task or the tasks allocated to the mining vehicle.

4. The method of claim 2, wherein the mining routes are spatially discretized into the regions of interest based on interdependencies of the tasks allocated to the mining vehicles such that a first task that relies on completion of a second task are included in a first region of interest and other tasks that do not rely on completion of the first task or the second task are included in other regions of interest in the tasks as allocated to the mining vehicles.

5. The method of claim 1, further comprising discretizing velocities of the mining vehicles into different designated velocity values, wherein the set of one or more allowable areas of movement, speeds, turns, or directions of movement is determined for each mining vehicle to designate two or more of the designated velocity values as speeds that the mining vehicle receiving the set of one or more allowable areas of movement, speeds, turns, or directions of movement is permitted to move during performance of the task or tasks allocated to the mining vehicle.

6. A method for guiding and coordinating vehicular traffic, the method comprising:

determining tasks to be completed by mining vehicles in a transportation network formed by plural interconnected routes in order to complete an objective;

allocating the tasks to be completed by the mining vehicles in the transportation network among the mining vehicles;

determining sets of one or more allowable areas of movement, speeds, turns, or directions of movement for the mining vehicles based at least in part on allocation of the tasks, the sets of one or more allowable areas of movement, speeds, turns, or directions of movement dictating one or more plural different allowable areas of movement, speeds, turns, or directions of movement that the mining vehicles are allowed to perform in order to complete the task or the tasks allocated to the mining vehicles, wherein the sets of one or more allowable areas of movement, speeds, turns, or directions of movement are determined such that the mining vehicles are scheduled to complete the tasks and complete the objective without two or more of the mining vehicles colliding or blocking movement of each other;

communicating the sets of one or more allowable areas of movement, speeds, turns, or directions of movement to the mining vehicles such that the mining vehicles are permitted to select one or more of the allowable areas of movement, speeds, turns, or directions of movement in the sets communicated to the respective mining vehicles and prohibited from performing one or more other actions during performance of the tasks allocated to the mining vehicles.

7. The method of claim 6, further comprising:

updating statuses of the mining vehicles at a central controller responsive to the mining vehicles operating according to one or more of the allowable areas of movement, speeds, turns, or directions of movement in the sets of one or more allowable areas of movement, speeds, turns, or directions of movement communicated to the mining vehicles; and determining an updated set of one or more allowable areas of movement, speeds, turns, or directions of movement for one or more of the mining vehicles based at least in part on the tasks as allocated to the mining vehicles and the statuses of the mining vehicles that are updated, wherein the updated set of one or more allowable areas of movement, speeds, turns, or directions of movement for the one or more mining vehicles is determined such that the mining vehicles are scheduled to complete the tasks and complete the objective without two or more of the mining vehicles colliding or blocking each other.

8. The method of claim 6, wherein the transportation network is a mine.

9. The method of claim 6, wherein the objective includes one or more of removing a first amount of cargo from a location or moving at least a second amount of the cargo that is associated with a designated amount of throughput.

10. The method of claim 6, wherein allocating the tasks among the mining vehicles includes:

receiving, at a central controller that is off-board the mining vehicles, status signals from the mining vehicles that are representative of one or more of current statuses of the mining vehicles or capacities of the mining vehicles to perform the tasks;

comparing the one or more of current statuses or capacities of the mining vehicles to requirements of the tasks; and allocating the tasks among the mining vehicles based on a comparison between the requirements of the tasks and the status signals received from the mining vehicles.

11. The method of claim 6, wherein the sets of one or more allowable areas of movement, speeds, turns, or directions of movement are determined to direct the mining vehicles to concurrently move according to the one or more allowable areas of movement, speeds, turns, or directions of movement in the sets.

12. The method of claim 6, further comprising spatially discretizing the routes into separate, non-overlapping regions of interest, wherein the sets of one or more allowable areas of movement, speeds, turns, or directions of movement are determined for the mining vehicles to prevent the mining vehicles receiving the sets of one or more allowable areas of movement, speeds, turns, or directions of movement from leaving the regions of interest in which the mining vehicles are located during performance of the tasks allocated to the mining vehicles.

13. The method of claim 12, further comprising spatially discretizing the regions of interest into one or more non-overlapping spatial sections, wherein the sets of one or more allowable areas of movement, speeds, turns, or directions of movement are determined for the mining vehicles to prevent the mining vehicles from leaving respective sections of the one or more sections during performance of the tasks allocated to the mining vehicles.

14. The method of claim 12, wherein the routes are spatially discretized into the regions of interest based on interdependencies of the tasks allocated to the mining vehicles such that a first task that relies on completion of a second task are included in a first region of interest and other tasks that do not rely on completion of the first task or the second task are included in other regions of interest in the tasks as allocated among the mining vehicles.

* * * * *